July 22, 1958   F. WAGNER ET AL   2,844,081
ELECTRICAL FLASHLIGHT DEVICE WITH CONDENSER IGNITION
Filed April 2, 1953
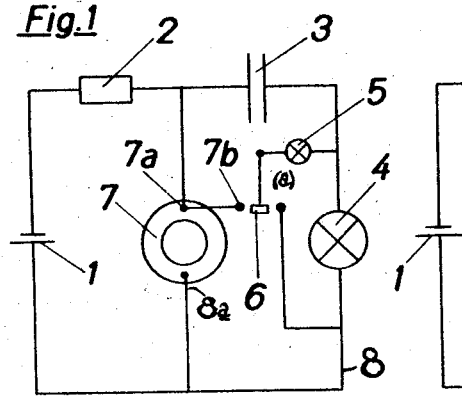
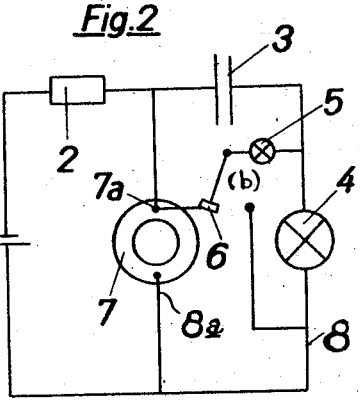
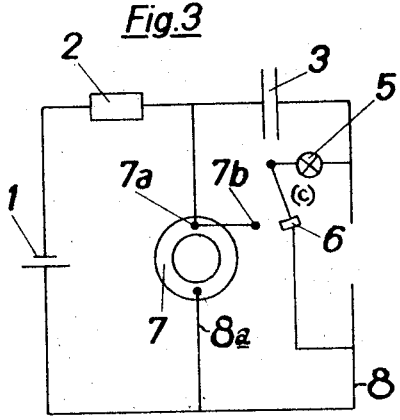
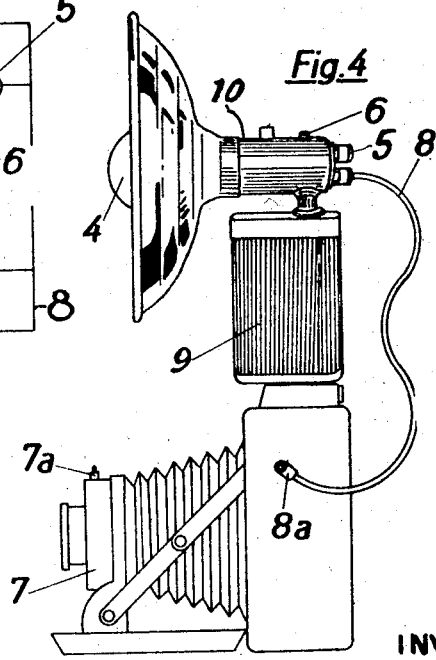
INVENTORS
FERDINAND WAGNER
MAX SAILER
By
THEIR ATTORNEYS

United States Patent Office 2,844,081
Patented July 22, 1958

2,844,081

ELECTRICAL FLASHLIGHT DEVICE WITH CONDENSER IGNITION

Ferdinand Wagner and Max Sailer, Munich, Germany, assignors to Agfa Aktiengesellschaft, Leverkusen-Bayerwerk, Germany, a corporation of Germany Application April 2, 1953, Serial No. 346,466

Claims priority, application Germany April 22, 1952

3 Claims. (Cl. 95—11.5)

The present invention relates to cameras having an electrical flashlight device for flash bulbs that are to be once ignited and having an ignition circuit with a source of electrical energy, a high ohm resistance, a capacitor in series with the load current circuit for the flash bulb. More particularly, the invention relates to a simplified testing system for periodically testing the condition of the illuminating circuit in conventional photoflash cameras employing the above-described form of flash ignition circuit.

Photoflash camera devices are well known, and it is also no longer new to load the condenser alternately over the high ohm resistance or over the flash lamp. In such arrangements, the photographic shutter is electrically connected with the flash light device by a synchronous switch which is built into the shutter and which closes the unloading current circuit concurrently with the opening of the shutter so that the condenser unloads over the flash lamp. In such devices there is usually employed as the current source of the network, a dynamo or a battery, while as a flashlight, it is customary to use a vacuum flash lamp that can be ignited only once.

According to the invention it is now proposed that with such an electrical flashlight device having a condenser ignition there is arranged a testing or control lamp which will indicate the orderly operating condition of the flashlight circuit, and which furthermore permits a testing of the flash lamp with respect to the value of current transmission. Accordingly, the test lamp and the test lamp switch means are arranged in parallel relationship to the flash lamp so that the condenser can unload over the flash lamp or the test lamp, as desired. The test lamp switch means is preferably formed from the conventional terminal elements and conduit cable carried by such type cameras, and in accordance with the preferred embodiment of the invention, functions as a three-position switch means. In one position of the switch means, the path of current leads from the current source over the resistance, the condenser and the flash lamp, to the source of current. In this position the condenser is loaded in a known way over the flash lamp. If one now connects the flash lamp electrically with the usual switch synchronized with the photographic shutter, then upon actuation of the shutter the condenser unloads directly over the flash lamp. In the second position the switch means completes the current path with the flash lamp inserted, by unloading the condenser over the test lamp while connecting the branch of the test lamp current circuit that leads to the test lamp with the shutter plug or by direct connection with a plate of the condenser. In the third position of the switch means, the path of current leads from the current source over the resistance, the condenser through the test lamp, and in parallel relationship to the socket for supporting the usual flash lamp; this position of the switch means being utilized when the flashlight is not inserted in its socket. In such case the synchronized flashlight switch, which is built into the photographic shutters, serves to close the unloading current circuit.

In practice, the above-described test circuit arrangement may be easily provided by introducing a small test lamp having, for example, a 6-volt rating with a current acceptance of 0.07 ampere in a parallel branch relationship with the usual flash lamp socket, one terminal of the test lamp being connected in series with one plate of the condenser and the other terminal of the tets lamp being connected with the usual conduit cable which leads from the condenser to the shutter switch mechanism in contemporary photoflash cameras. In such case the various switching connections may be accomplished through the simple expedient of touching the cable end to the shutter plug, to the condenser plate, or to the touch button normally provided for snapping the picture. A suitable choice of the value of the condenser will insure that the stored electrical energy will not suffice to melt the filament of the small test lamp during the momentary unloading periods (approximately $\frac{1}{100}$ of a second) encountered in testing, or even to unduly load the same.

Having broadly described the invention, reference will now be made to the accompanying drawings in describing a specific embodiment thereof, and in which:

Fig. 1 is a diagram of the electrical circuit with the switch means in position (a) and the test lamp out of circuit, Fig. 2 shows the circuit of Fig. 1 with the switch in position (b), Fig. 3 shows the circuit of Fig. 1 with the switch in position (c), and Fig. 4 is an elevation view of the entire flash device as mounted upon a photographic camera.

In the circuit diagrams shown in Figs. 1 to 3 inclusive, 1 represents an electric battery, preferably a small rod battery of the customary 22.5 volts value; 2 represents a high ohmic resistance of, for example, 2,000 ohms; 3 represents a condenser having a capacity of 100 $\mu$f.; 4 represents the flash lamp; 5 represents the test lamp; and 6 is the testing switch means, preferably of the pressure button type. The photo illuminating circuit is also connected to the photographic shutter which has a built in synchronized switch unit, connected in the circuit, as indicated by the reference numerals 7 and 7a. The switch 6 can assume three different positions, namely a, b and c.

The arrangement of the switch mechanisms 6 and 7 in cooperation with a conventional photoflash camera is illustrated in Fig. 4. As illustrated, the casing 9 enclosing the battery, resistor and condenser is mounted directly over the camera body and supports a mounting 10 for the photoflash bulb 4, the test lamp 5 and a pressure switch member 6, the components being arranged in electrical relationship in the manner illustrated in the circuit diagram of Figs. 1 through 3 inclusive. The shutter switch mechanism 7, 7a is carried adjacent the lens portion of the camera and is connected in circuit with the remainder of the electrical control elements by means of a lead cable 8 having a contact sleeve 8a, the sleeve 8a being adapted to be electrically connected with the shutter switch segment 7 through conductive members in the camera structure in the usual manner. It will be appreciated that the arrangement as illustrated is merely exemplary, however, and other and different arrangements of the electrical components may be used without departing from the invention.

The operation of the device will be apparent from an inspection of the circuit diagrams of Figs. 1 through 3 inclusive, which illustrate the testing switch mechanism 6 in its respective positions, individually labeled as a, b and c. As shown in Fig. 1, the switch is in its usual position and the test lamp 5 is completely deenergized and inoperative. The photoflash lamp 4 is in series with the condenser 3, resistor 2 and battery 1, but is normally prevented from ignition due to the apparent open circuit load imposed by the resistor. The resistor 2 is adapted to be shorted out of the circuit by the photographic shutter switch mechanism 7a, 7, which upon opening of the shutter will move to connect the condenser in circuit with lead 8a, cable 8 and flash bulb 4 to ignite the same in the conventional manner.

When it is desired to test the illumination circuit with the flash bulb inserted in its holder in readiness for operation and without exposing the film by operation of the shutter switch mechanism, the testing switch 6 is moved to the position b, as illustrated in Fig. 2, in which it connects test bulb 5 in series circuit with a shutter switch contact 7a to complete a circuit from condenser 3 through test lamp 5 and in short circuited relationship to the resistor 2. When the switch is closed as by pressure contact by the operator's finger, the operative condition of the circuit will be indicated by illumination of test bulb 5. Removal of pressure from switch 6 will permit the same to return to the intermediate position shown in Fig. 1, wherein test bulb 5 is disconnected. The operator may thus proceed to take a picture through operation of the shutter switch mechanism 7, 7a in the usual manner.

It is often desirable to test not only the operative condition of the condenser and battery, but also to test the switch mechanism 7, 7a, particularly with respect to its synchronism with a shutter opening. In such case it is usually desirable to test the same with the photoflash bulb removed. This type of operation is broadly accommodated by the present invention by adapting the testing switch to have a further operative position c, as indicated in Fig. 3 of the drawings. In this position of the testing switch, the test lamp 5 will be connected in series with the shutter switch mechanism 7a, 7, across the condenser 3, the lamp becoming energized upon closure of switch 7a, 7.

One of the distinct advantages of the present arrangement is that it permits a testing of a photoflash ignition circuit without securing the presence of a photoflash lamp. A further distinct advantage of the present testing arrangement is that it permits a testing of the ignition circuit with the photoflash lamp in circuit in position to be energized but without requiring that the shutter mechanism switch be actuated. This latter innovation constitutes a clear-cut improvement over known prior testing arrangements wherein it was impossible to test the ignition circuit with a photoflash lamp in place without either igniting the lamp or causing a premature exposure of the photographic film through shutter opening of the switch mechanism.

Although the preferred form of the invention is illustrated as a three-pole, three-throw switch, it will be appreciated by those skilled in the art that the same form of operation may be accomplished with a double-throw, double-pole switch providing the circuit connection, as illustrated in Figs. 1 and 2 of the drawings. In such case the testing circuit connections for testing the operative condition of the circuit and the shutter switch mechanism with the photoflash lamp removed may be made by connecting the end of cable 8 to the top of the touch button 6, whereby they provide an equivalent circuit to that of Fig. 3 with only a two-pole switch. Alternatively, the two-pole switch mechanism 6 may be so arranged as to provide the circuit connections illustrated in Figs. 1 and 3; the third alternative position for testing the condition of the ignition circuit without requiring an operation of the shutter switch mechanism being provided by connection of the cable end 8a to the switch contact 7a to provide an equivalent circuit to that of Fig. 2.

As many apparently widely different embodiments of the invention may be made without departing from the spirit and scope hereof, it is to be understood that the above invention is not limited, except as defined in the appended claims.

What is claimed is:

1. A photoflash device including a housing for use with a photographic camera which incorporates a shutter mechanism, said device comprising an ignition circuit disposed within said housing, said circuit including a source of electrical energy, a resistor connected in series-circuit relationship to said source, a condenser connected in series-circuit relationship to said resistor, a flashlamp socket mounted on said housing and connected in series-circuit relationship between said source of electrical energy and said condenser, a normally open shutter switch including contacts, coupling means operatively connecting said shutter switch to said shutter mechanism which closes said shutter switch upon actuation of said shutter mechanism, detachable electrical coupling means connecting said shutter switch in parallel across said condenser and said flashlamp socket, means for testing the operative condition of said circuit including a test lamp and selector switch means which incorporates selectively inter-connectable contact elements for selectively connecting said test lamp in parallel with said condenser or with said flashlamp socket or for switching off said test lamp from said circuit, one end of said test lamp being connected to the junction point between one plate of said condenser and one end of said flashlamp socket, the other end of said test lamp being connected to one contact element of said selector switch means, another of said contact elements being connected to the junction point between the other plate of said condenser and one contact of said shutter switch, and still another contact element of said selector switch means being connected to the junction point between the other contact of said shutter switch and the other end of said flashlamp socket.

2. A photoflash device as set forth in claim 1 wherein said source of electrical energy, said resistor, said condenser and said flashlamp socket are connected in a continuous closed circuit; said shutter switch mechanism is connected across said continuous closed circuit; one end of said shutter switch mechanism being connected to the junction between said resistor and said condenser; and the other end of said shutter switch mechanism being connected to the junction between said source of electrical energy and said flashlamp socket.

3. A photoflash device as set forth in claim 2 wherein said selector switch includes a movable contact element, said other end of said test lamp being connected to said movable contact element, and said another and said still another contact elements of said selector switch means being stationary contact elements of said selector switch.

References Cited in the file of this patent

UNITED STATES PATENTS

| 2,455,365 | Jenner | Dec. 7, 1948 |
| 2,590,069 | Robinson | Mar. 18, 1952 |
| 2,638,764 | Schwartz et al. | May 19, 1953 |
| 2,646,672 | Fairbank | July 28, 1953 |

FOREIGN PATENTS

| 370,142 | Great Britain | Apr. 7, 1932 |